(12) United States Patent
Christensen et al.

(10) Patent No.: US 8,805,849 B1
(45) Date of Patent: Aug. 12, 2014

(54) ENABLING USE OF ANALYTIC FUNCTIONS FOR DISTRIBUTED STORAGE SYSTEM DATA

(75) Inventors: Aaron C. Christensen, Apple Valley, MN (US); Nitin Suresh Supekar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/528,184

(22) Filed: Jun. 20, 2012

(51) Int. Cl.
*G06F 17/30* (2006.01)
(52) U.S. Cl.
USPC .............................. 707/741; 707/711; 707/640
(58) Field of Classification Search
CPC ..................... G06F 17/30961; G06F 17/30289; G06F 17/30516; G06F 17/30
USPC ................. 707/637, 736, 741, 755, 711, 640, 707/E17.014, 797, E17.044, 999.1, 707/E17.012
See application file for complete search history.

(56) References Cited

U.S. PATENT DOCUMENTS

| 8,429,198 | B1 * | 4/2013 | Sim-Tang ...................... 707/797 |
| 2001/0048804 | A1 * | 12/2001 | Yoo et al. ........................ 386/69 |
| 2007/0100851 | A1 * | 5/2007 | Golovchinsky et al. ...... 707/100 |
| 2010/0146004 | A1 * | 6/2010 | Sim-Tang ...................... 707/797 |
| 2010/0161569 | A1 * | 6/2010 | Schreter ......................... 707/696 |
| 2010/0281028 | A1 * | 11/2010 | Luo et al. ........................ 707/741 |
| 2011/0145712 | A1 * | 6/2011 | Pontier et al. .................. 715/738 |
| 2012/0084523 | A1 * | 4/2012 | Littlefield et al. .............. 711/162 |
| 2012/0303597 | A1 * | 11/2012 | Bird et al. ...................... 707/693 |

OTHER PUBLICATIONS

Hadoop Tutorial from Yahoo; YDN; "Module 4: MapReduce;" http://developer.yahoo.com/hadoop/tutorial/module4.html; 2012; 15 pages.
"MapReduce" from Wikipedia, http://en.wikipedia.org/wiki/MapReduce; Sep. 2012; 6 pages.
Sproehnle, Sarah, "Cloudera: Developing Application for Apache Hadoop," PowerPoint Presentation 2012; 115 pages.

* cited by examiner

*Primary Examiner* — Debbie Le
(74) *Attorney, Agent, or Firm* — Campbell Stephenson LLP

(57) ABSTRACT

Various systems and methods for enabling use of analytic functions for distributed storage data are described. For example, one method involves generating an index for a data stream that includes a plurality of objects. The index indicates a location of each of the plurality of objects. The method also involves performing a plurality of first functions that generate a plurality of first outputs. Performing these first functions includes accessing objects based on the index and generating an output for each object. Each output also includes the respective object. The method also involves performing one or more second functions, where the second functions use the first outputs.

21 Claims, 13 Drawing Sheets

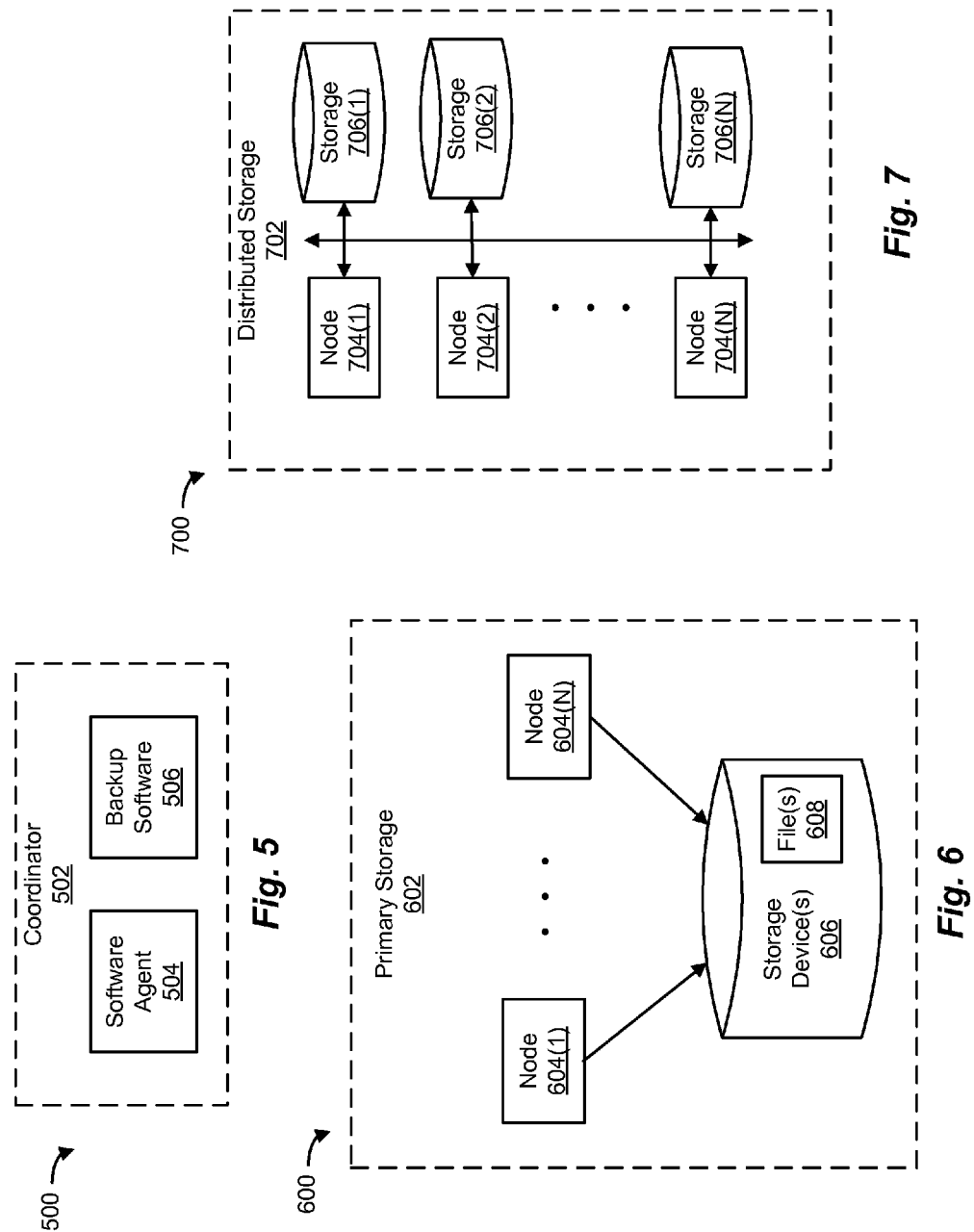

ENABLING USE OF ANALYTIC FUNCTIONS FOR DISTRIBUTED STORAGE SYSTEM DATA

BACKGROUND OF THE INVENTION

1. Field of the Invention

This application related to distributed storage systems. Particularly, this application relates to enabling analytics while storing data using distributed storage systems.

2. Description of the Related Art

Companies today extensively rely on online, frequently accessed, constantly changing data to run their businesses. Analysis of such data, such as by using analytics, can give great insight to the business operations. Furthermore, when disaster strikes, companies must be prepared to eliminate or minimize data loss, and recover quickly with useable data. Data backup can be used to prevent data loss in case of any such disaster. A data backup process typically creates copies of original data. These copies can be used to restore the original data after a data loss event. The backed-up data can be stored using a variety of media, such as magnetic tape, hard drives, and/or optical storage, among others. Various techniques can be used to optimize such backups, such as to improve backup speed, restore speed, data security, media usage and/or reduce bandwidth requirements.

BRIEF DESCRIPTION OF THE DRAWINGS

The embodiments of the present application may be better understood, and its numerous objects, features, and advantages made apparent to those skilled in the art by referencing the accompanying drawings.

FIG. 5 is a block diagram of a coordinator node, according to one embodiment.

FIG. 6 is a block diagram of a data cluster, according to one embodiment.

FIG. 7 is a block diagram of a storage subsystem, according to some embodiments.

Figure 1:
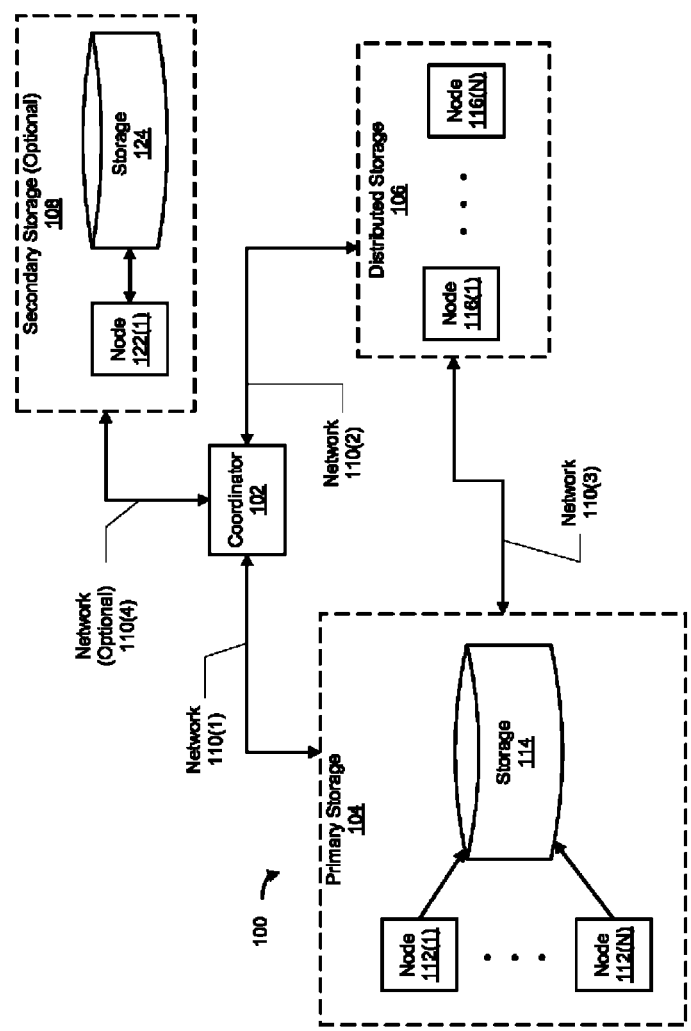
FIG. 1 is a block diagram illustrating a distributed storage system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Modern distributed storage environments may include multiple storage objects connected via one or more interconnection networks. The interconnection networks provide the infrastructure to connect the various elements of a distributed shared storage environment. Storage systems frequently use data redundancy mechanisms to ensure data integrity, consistency, and availability. Other uses for data redundancy may include backing up data, distributed load sharing, disaster recovery, or point-in-time analysis and reporting. One approach to data redundancy is to back up data from a primary storage system to a second storage system.

Furthermore, various companies may wish to execute various analytics against their stored data. For example, such analytics can include various data mining operations on stored data, performing trend analysis of data, predictive analytics, and/or e-discovery operations, among others. However, some companies may have so much information that this information can be difficult to process using conventional methods such as using a database or data warehouse. The system(s) and method(s) described herein enable using distributed storage systems for performing various analytics. In one embodiment, this method includes generating index(es) for data streams that can be stored in such distributed storage systems, and then executing map-reduce functions on this data stream(s) to generate output(s), such as output file(s). This output can then be used by analytics software to perform various analytic(s). An example system for enabling use if distributed storage systems for performing various analytics is described below with reference to FIG. 1.

FIG. 1 is a block diagram illustrating a distributed system 100 that includes a collection of nodes and storage. Distributed system 100 includes several nodes and/or subsystems, e.g., a coordinator node 102, a storage subsystem 104, distributed storage 106, and optionally, secondary storage 108. Each of coordinator node 102, storage subsystem 104, data cluster 106, and secondary storage 108 can communicate with each other using a network, e.g., network 110(1)-110(4). Network 110(1)-110(4) can include a local area network (LAN), a wide area network (WAN), a storage area network (SAN), Ethernet, and/or any combination thereof. It is noted that distributed system 100 may include a different number of elements.

Primary storage 104 can store data using node(s) 112(1)-112(N) and storage 114. In one embodiment, coordinator node (also referred to as coordinator) 102 accesses (e.g., over network 110(1)) primary storage 106. Coordinator 102 can perform a backup of the data stored by primary storage 104.

This backup can be stored using distributed storage 106 and/or secondary storage 108. For example, a data stream can be sent by primary storage 104 to coordinator 102. Such data stream can include a variety of objects, each of which can be generated by one or more applications. Coordinator 102 can process this data stream and store the processed data stream using distributed storage 106 and/or secondary storage 108. This processing by coordinator node can include generating an index for the data stream, where this index indicates location of objects in the data stream. This index and the data stream can be stored using distributed storage 106, which can be implemented using a distributed file system, such a system implemented using an APACHE HADOOP architecture, and/or other distributed large data set architecture.

Coordinator 102 can initiate performance of various functions, such as map-reduce functions, by distributed storage 106. The map-reduce functions can be executed using nodes 116(1)-116(N). The map-reduce functions can generate output file(s) that store objects that were identified by the index. This output file can then be used by analytics software to perform various analytics on the objects (that were originally sent using the data stream). An example method of using the distributed system of FIG. 1 is described below with reference to FIG. 2.

Figure 2:
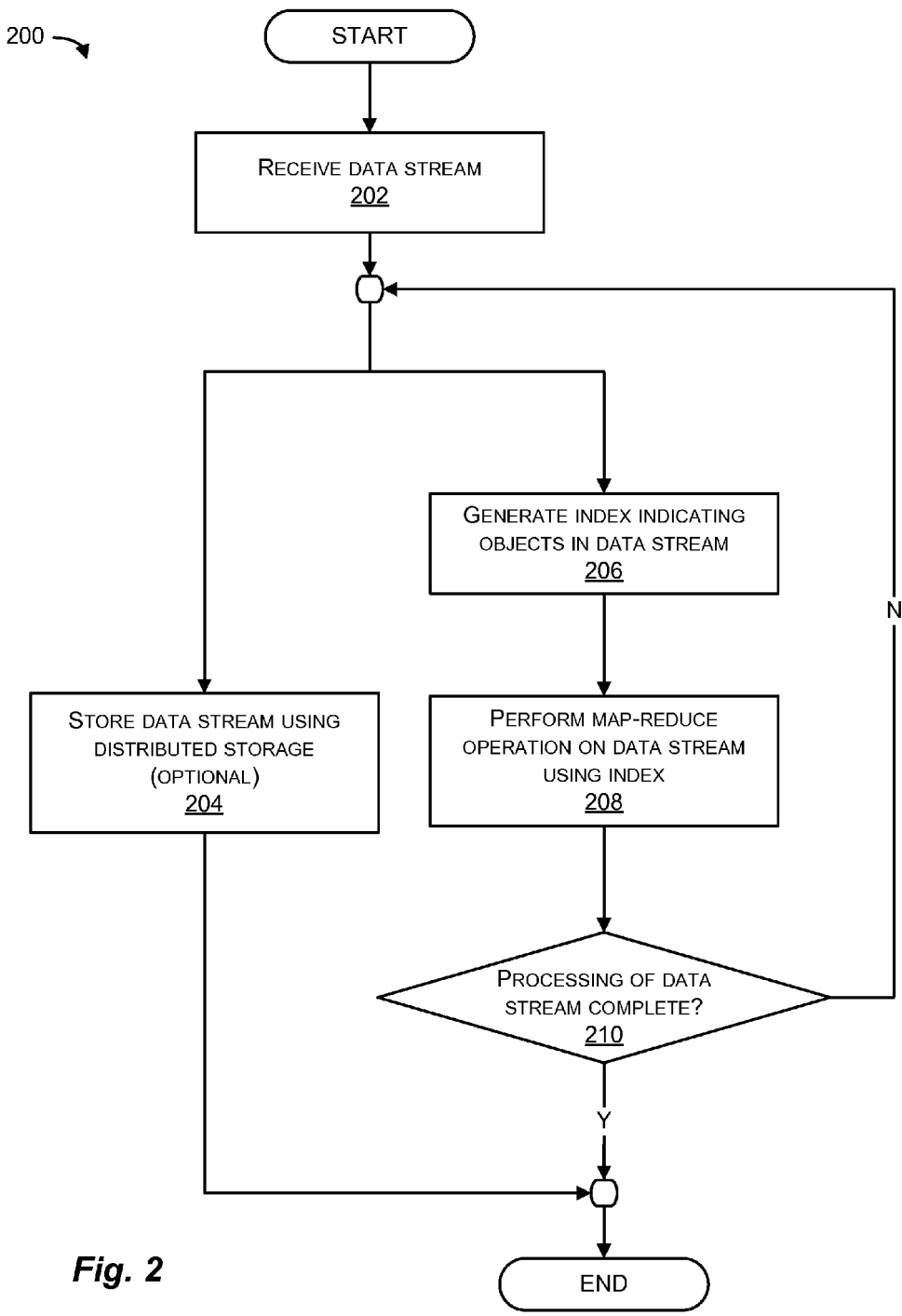
FIG. 2 is a flowchart illustrating a method for processing of a data stream, according to one or more embodiments.

FIG. 2 is a flowchart illustrating a method 200 for processing of a data stream, according to one embodiment. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 200 is described with reference to variations of the elements described in connection with FIG. 1.

In element 202, the data stream is received. According to one embodiment, for example, controller 102 receives a data stream from primary storage 104. Controller 102 can also perform various data backup and other operations using this data stream. The data stream contains multiple objects, which may be generated by a variety of applications. Coordinator 102 can analyze and interpret data in the data stream to determine the location and type of each of the objects in the data stream.

In element 204, the data stream is stored using distributed storage, according to one embodiment. For example, coordinator 204 can store the data stream using distributed storage 106. In one embodiment, the data stream can be stored using the secondary storage (e.g., secondary storage 108) in addition to using distributed storage 106. Although data stored using distributed storage 106 is used by other element(s) of method 200, it is noted that any such storage can be temporary in nature, e.g., until an output file is generated.

In element 206, an index is generated that indicates objects in the data stream, according to one embodiment. For example, coordinator 102 can generate the index for the received data stream. In one implementation, the index can be generated based on information received from backup software. For example, coordinator 102 can include both a backup module (that generates backups, e.g., from received data streams) and a software element (e.g., agent) that uses information generated by this backup module to generate the index.

In element 208, map-reduce operation(s) are performed on the data stream using the index, according to one embodiment. For example, coordinator 102 can initiate execution of map-reduce functions (that perform the map-reduce operation(s)). The map-reduce functions are performed by nodes (e.g., nodes 116(1)-116(N)) of the distributed storage system (e.g., distributed system 106). In one implementation, the map-reduce operation(s) can produce an output file that contains the objects of the data stream.

In element 210, a determination is made as to whether the processing of the data stream is complete, according to one embodiment. For example, coordinator 102 can determine whether the data stream (received from primary storage 104) is processed. If the data stream is processed, method 200 ends. If the data stream is not processed, method 200 loops back to element(s) 206 and/or 204.

Figure 3:
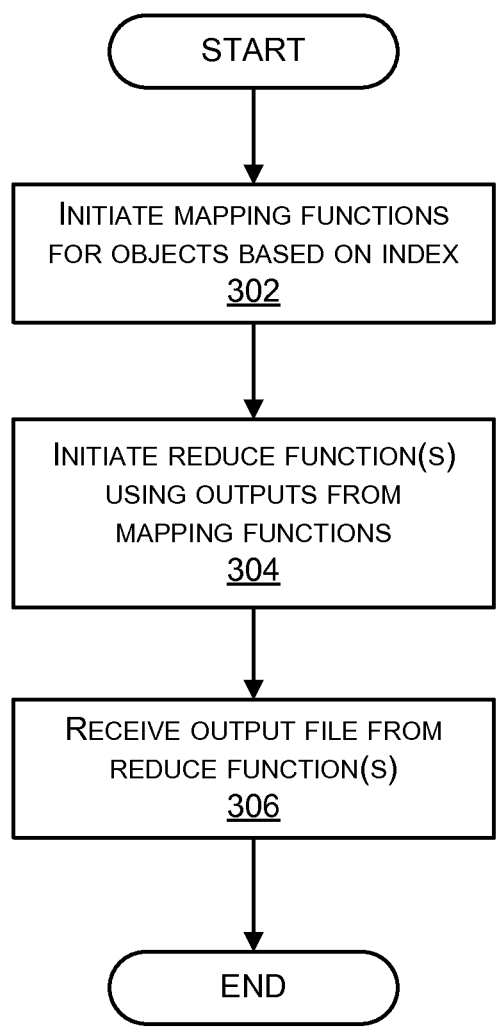
FIG. 3 is a flowchart illustrating a method for using functions that access an index and/or a data stream, according to one or more embodiments.

FIG. 3 is a flowchart 300 of a method for using functions that access an index and/or a data stream, according to one or more embodiments. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 300 is described with reference to variations of the elements described in connection with FIG. 1. In one embodiment, the method of FIG. 3 implements element 208 of FIG. 2.

In element 302, mapping functions are initiated. According to one embodiment, these mapping functions access objects in the data stream based on the index. In one implementation, the nodes of the distributed storage system can operate on data that is also stored using the distributed storage system. Coordinator 102 (e.g., a software agent) can initiate performance (e.g., execution) of mapping functions. These mapping functions can be implemented by node(s) 116(1)-116(N). For example, each mapping function can access a separate object in the data stream, as indicated by the index. In one implementation, the index can be an index file, although other implementations are contemplated. The output of each such mapping function can be the respective object that was accessed by that mapping function. As a result, the mapping functions can access, in parallel (or substantially in parallel) the data stream, and generate multiple outputs. These multiple outputs can contain the objects that were indicated by the index. It is noted that one or more of nodes 116(1)-116(N) can store various portions of the data stream. In one implementation, each of nodes 116(1)-116(N) can perform at least the mapping function on the portion of the data stream that it stores.

In element 304, one or more reduce function(s) are initiated. According to one embodiment, these reduce functions access the outputs generated by the mapping functions (element 302). In one implementation, the reduce function(s) can also be implemented by one or more of the nodes of the distributed storage system, e.g., by node(s) 116(1)-116(N). Coordinator 102 (e.g., a software agent) can initiate performance (e.g., execution) of reduce function(s) by node(s) 116(1)-116(N). For example, the reduce function(s) can operate on the outputs generated by the mapping functions. The reduce function(s) generate an output (i.e., a reduce output), which can include an output file. This reduce output can thus include all (or substantially all) of the objects that were indicated by the index. In one implementation, the reduce function(s) can also be performed in parallel (or substantially in parallel), thus creating a reduce output that contains objects that can be used for analytics, which is described below with reference to FIG. 4.

Figure 4:
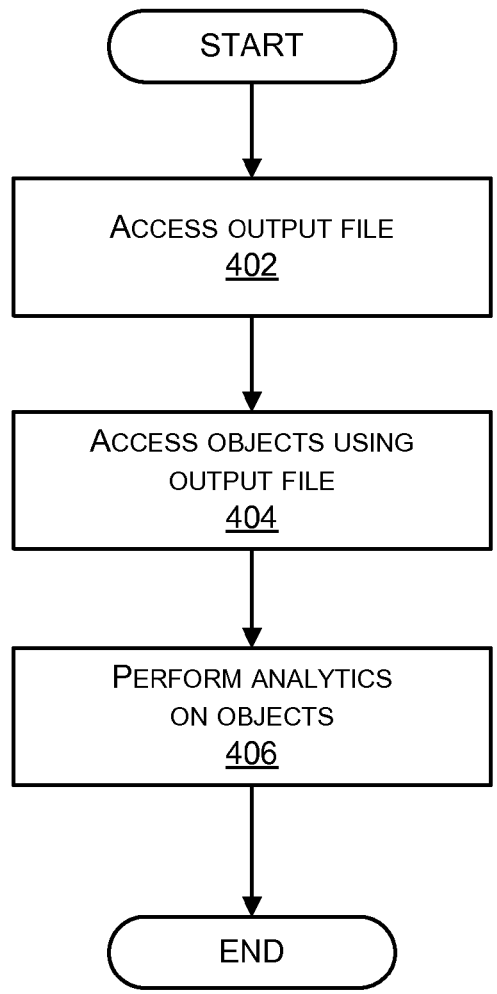
FIG. 4 is a flowchart illustrating using analytics based on an output file, according to one or more embodiments.

FIG. 4 is a flowchart 400 of a method for initiating various functions to generate an output file based on a data stream, according to one or more embodiments. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 400 is described with reference to variations of the elements described in connection with FIG. 1.

In element 402, an output file is accessed, according to one embodiment. For example, an analytics module can access the output file (or another type of reduce output), such as one generated in element 306. In some implementations, another type of module, such as an e-discovery module that performs e-discovery on data, can be used instead of the analytics module.

In element 404, the objects are accessed using the output file, according to one embodiment. For example, the analytics module can access objects in the output file (or another type of reduce output). In one embodiment, the analytics module does not need to access the stored data stream to perform the analytics.

In element 406, analytics are performed on the objects. For example, the analytics module can access the objects (in the output file or another type of reduce output). By using methods 200-400, the coordinator can move data from primary storage to servers of analytics software without using separate process(es) and/or module(s) (which can degrade quality of service for users and other applications). Furthermore, the coordinator can efficiently use data from the primary storage without ignoring individual objects within the data stream.

FIG. 5 is a block diagram 500 of a coordinator node 502, according to one embodiment. Coordinator node 502 can implement coordinator node 102 of FIG. 1. Coordinator node 502 includes a software agent 504 and backup software 506. Backup software 506 can receive a data stream from primary storage and perform backup operations on that data stream, such as storing the data stream using secondary storage and/or distributed storage. In one embodiment, backup software 506 communicates various information to software agent 504. This information can include as boundary information and/or metadata regarding the data stream, including location of objects in the data stream, types of objects, file names, among others. In one embodiment, software agent 504 can be a plug-in that interfaces with backup software 504 and/or the secondary storage. Software agent 504 can thus use information that is generated by backup software 506. In one implementation, when backup software 506 generates a backup of a data stream using the secondary storage (e.g., where this backup is stored using the secondary storage), software agent 504 can access the data stream and the information used by backup software 506. Software agent 504 can then create an index based on the accessed information, and store both the index and the data stream using the distributed storage.

In one embodiment, the software agent can instead access the data stream (and optionally, associated information, such as boundary information and/or metadata) from the secondary storage directly as the data stream is being written, without accessing the backup software. In another embodiment, the backup software can store the data stream using the distributed storage. In this case, the software agent can just create the index for the data stream being stored, without storing the data stream (as the backup software already stored the data stream using the distributed storage). For example, software agent 504 can be implemented using an Open Storage (OST) Application Programming Interface (API). This OST API-based software agent can access the backup software and write data to the distributed storage. In one embodiment, the OST API provides a pluggable interface to a backup storage device, e.g., that can be implemented by the backup software and/or the secondary storage.

FIG. 6 is a block diagram 600 of a primary storage 602, according to one embodiment. Primary storage 602 can implement primary storage 104 of FIG. 1. Primary storage 602 includes node(s) 604(1)-604(N), and storage device(s) 606. Storage device(s) 606 include files 608. Node(s) 604(1)-604(N) can coordinate storing of data using storage device(s) 606, such as by receiving data from client(s) (not shown). File(s) 608 can contain various objects, such as created by various client applications. File(s) 608 can, for example, include various email objects used by email application(s) and/or database objects used by database application(s), among others.

FIG. 7 is a block diagram 700 of distributed storage 702, according to one embodiment. Distributed storage 702 can implement distributed storage 106 of FIG. 1. Distributed storage 702 includes node(s) nodes 704(1)-704(N), and storage devices 706(1)-706(N). Nodes 704(1) can be coupled to storage devices 706(1)-706(N). In some implementations, distributed storage 702 can be implemented using HADOOP, which allows distributed parallel processing of large amounts of data across multiple nodes (e.g., servers). A Distributed File System (DFS), such as a HADOOP DFS (HDFS), is a distributed, scalable, and portable file system. Each node (e.g., node 704) in a DFS system can have a single data node. Each such data node can serve up blocks of data over the network using a block protocol specific to DFS. DFS can store large files across multiple nodes 704. In one implementation, the distributed storage system can store data blocks as instructed by the backup software and/or software agent. In one embodiment, one or more of nodes 702(1)-702(N) can store various portions of the data stream. Each of nodes 702(1)-702(N) can also perform the mapping function on the portion of the data stream that it stores.

Figure 8:
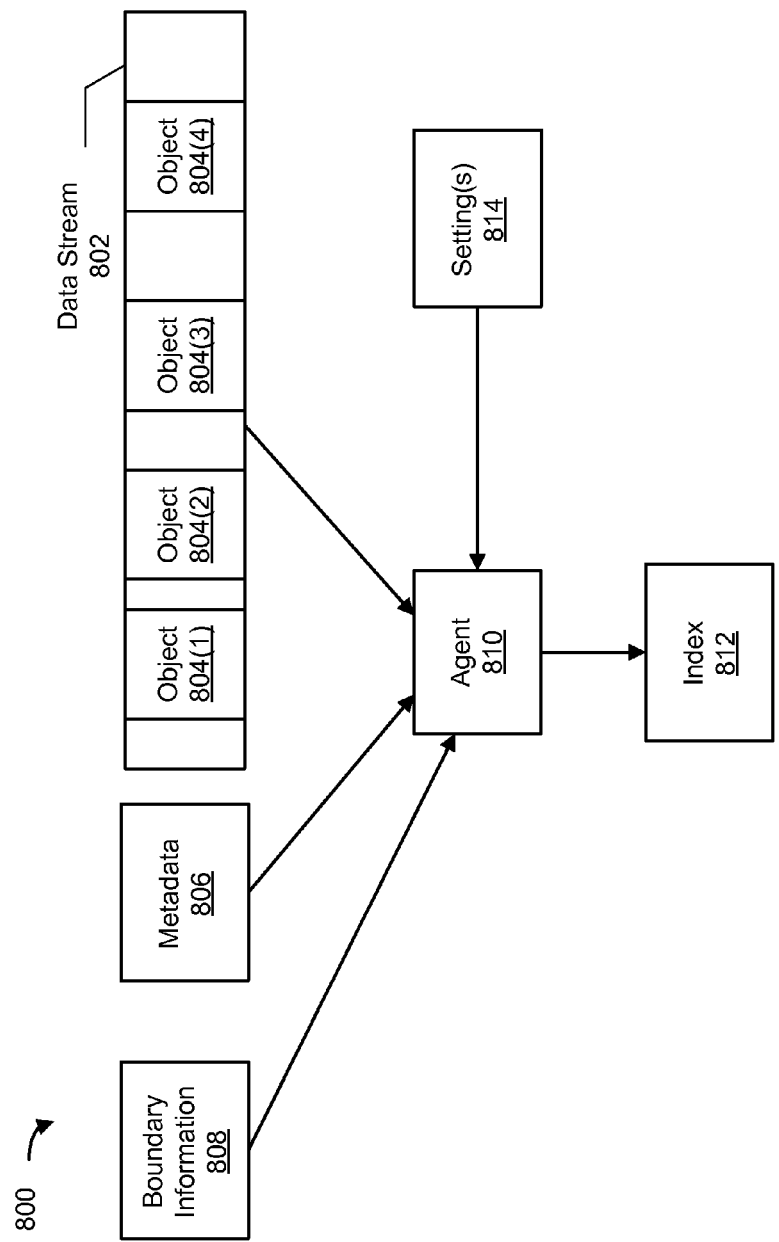
FIG. 8 is a block diagram illustrating generation of an index by a software agent, according to one embodiment.

FIG. 8 is a block diagram 800 illustrating generation of an index by a software agent, according to one embodiment. Software agent 810 accesses one or more of metadata 806 and/or boundary information 808, both of which can describe one or more characteristics of data stream 802. As described above with reference to FIG. 5, the backup software (and/or another element of the coordinator node and/or the secondary storage) can generate boundary information 808 and/or metadata 806 when performing backup of data stream 802. Data stream 802 can include multiple objects, such as objects 804(1)-804(4). As described above with reference to FIGS. 1 and 6, data stream 802 can be received from the primary storage.

In one embodiment, software agent 810 generates an index 812 (e.g., an index file) for data stream 802. Index 812 indicates location of each of objects 804(1)-804(4) in data stream 802. Agent 810 generates index 812 based on boundary information 808 and/or metadata 806. Example embodiments of each of boundary information, metadata, data stream, and index are described below with reference to FIGS. 9-12. In one embodiment, software agent 810 generates index 812 substantially at the same time that the backup software performs backup operations for data stream 802. Depending on the implementation, software agent 810 can also generate a copy of data stream to be stored in the distributed storage system, along with its associated index. In one embodiment, agent 810 can generate index 812 just by accessing boundary information 808 and/or metadata 806, without accessing data stream 802.

In some embodiments, index 812 (e.g., an index file) generated by software agent 810 does not indicate one or more objects in the data stream. Agent can make this determination based on a variety of factors, such as on metadata 806 and/or index settings 814. For example, index settings 814 can indicate to only index objects of a certain type (e.g., email objects, such as ones created by email applications). Thus, based on metadata 806 (that can indicate the type of each object in data stream 802), agent 810 can generate index that only indicates email objects, but not other types of objects, in data stream 802. In one embodiment, agent 810 can store (using the distributed storage system) only portions of data stream that contain the objects specified by settings 814. In one embodiment, settings 814 can indicate which objects of the data stream are to be processed using the map-reduce functions. Thus, data stream 802 is stored (e.g., by agent 810) using the distributed data system regardless of information specified by settings 814.

Figure 9:
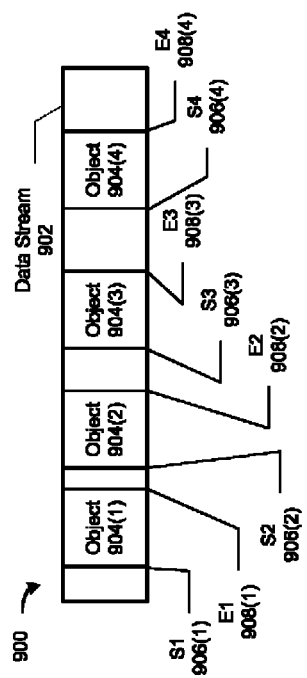
FIG. 9 is a block diagram illustrating a data stream, according to one embodiment.

FIG. 9 is a block diagram 900 of a data stream, according to one embodiment. Data stream 902 (which can be an implementation of data stream 802) includes objects 904(1)-904(4). Boundary information for data stream 902 can include starting offsets (S) 906(1)-906(4) for each objects, and ending offsets (E) 908(1)-908(4) for these objects. In one implementation, some objects can be distributed throughout the data stream. For example, a single object can include a first object portion 904(3) and a second object portion 904(4).

Figure 10:
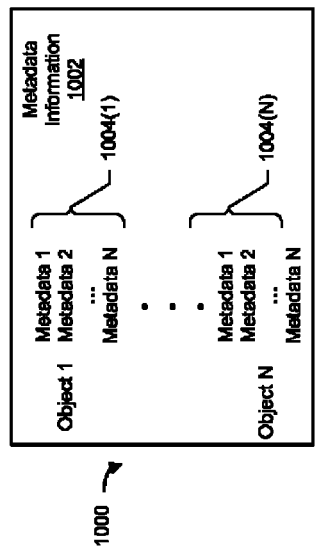
FIG. 10 is a block diagram illustrating metadata information, according to one embodiment.

FIG. 10 is a block diagram 1000 of metadata information 1002, according to one embodiment. Metadata information 1002 includes metadata 1004(1)-1004(N) that characterizes each object in the data stream. For example, metadata 1004(1) can characterize a first object in the data stream, such as object 904(1) in data stream 902. In some embodiments, metadata 1004(1)-1004(N) can include information such as filename, owner, permissions, times of creation, modification, access, and/or any other relevant metadata. In one embodiment, metadata 1004(1)-1004(N) can be created by the backup software during backup operation(s).

Figure 11:
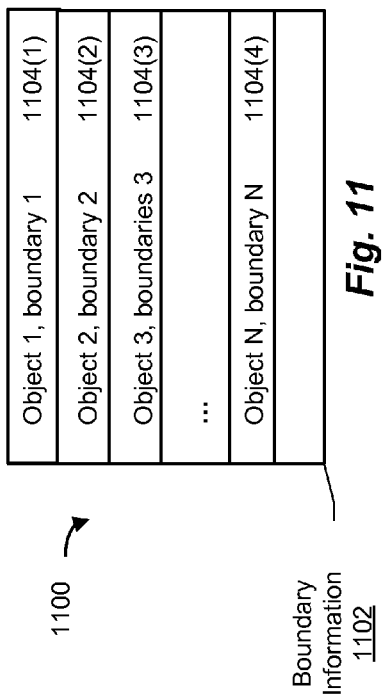
FIG. 11 is a block diagram illustrating boundary information, according to one embodiment.

FIG. 11 is a block diagram 1100 of boundary information 1102, according to one embodiment. Boundary information 1102 includes boundaries 1104(1)-1104(N) for each object in the data stream. In one embodiment, boundaries 1104(1)-1104(N) can include indications of starting and ending offsets, such as offsets 904(1)-904(4) and 906(1)-906(4), for each of the objects in data stream. However, other techniques for indicating boundaries of objects can be used instead of, or in addition to, using offsets.

Figure 12:
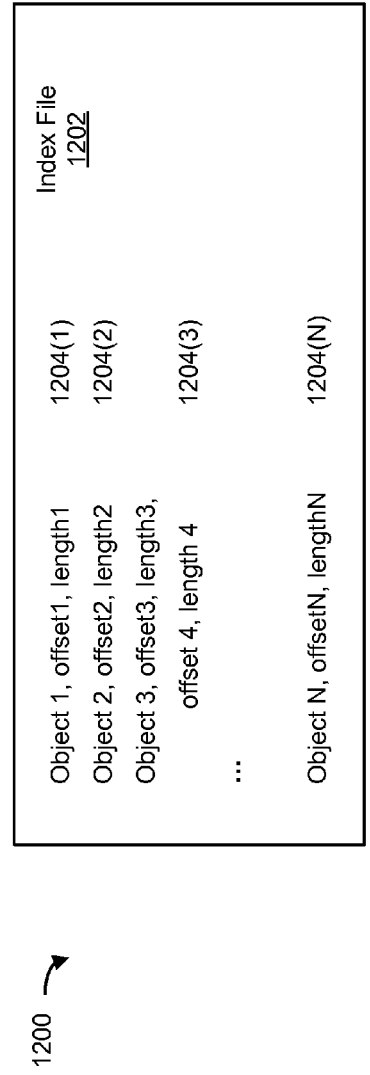
FIG. 12 is a block diagram illustrating an index, according to one embodiment.

FIG. 12 is a block diagram 1200 of an index 1202, according to one embodiment. Index 1202 can be an implementation of index 812 generated by agent 810. Index 1202 can include index information 1204(1)-1204(N) for each object in the data stream as it is stored by the distributed storage system. In one implementation, each index can contain object name, starting offset of that object, and length (e.g., in bytes or characters, etc) of that object in the data stream. However, other structures and/or formats of such index 1202 are contemplated. Some indexes, such as index 1204(3) can indicate multiple offsets for the same object, such as object portion 904(3) and object portion 904(4) indicating different portions of a single object. Each index 1204 can also indicate type of each object. In one embodiment, index 1202 can also indicate which objects of the data stream are to be processed using the map-reduce functions, such as indicated by index settings 814.

In one embodiment, index 1202 is a file, such as a text file (however, other formats are contemplated), that can be accessed by nodes of the distributed storage system (e.g., DFS nodes). Each line in index 1202 can relate to one object of the data stream. For example, a line for any object can describe extent(s) of the object. Extent can indicate the position(s) of where the object resides in the data stream, and the length of the object. If there are multiple extents, they can be listed in order. As a result, for an object, by concatenating the extents together in the order in the index, the object's data/content can be recreated. A line for any object can also describe metadata about that object.

Figure 13:
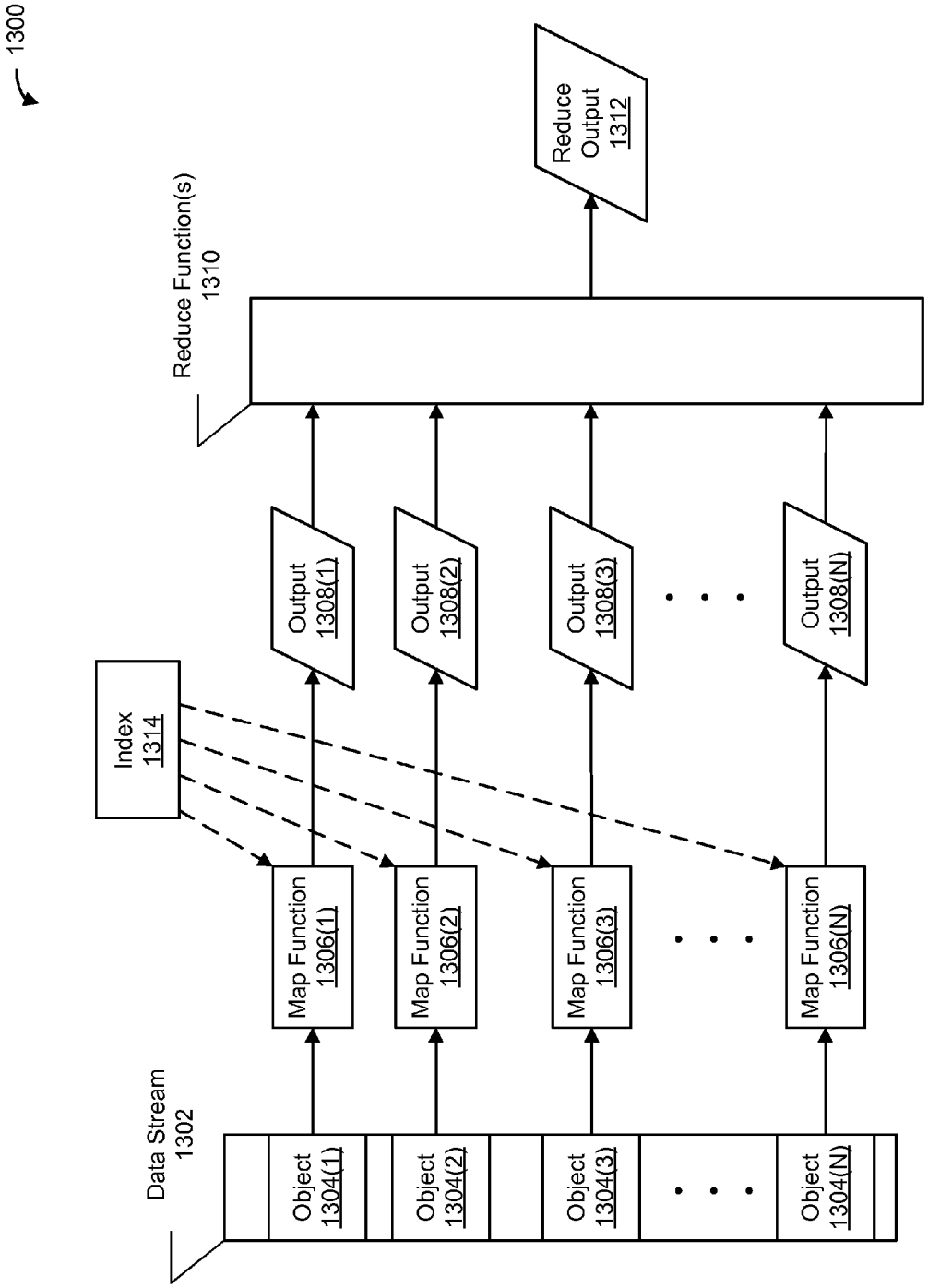
FIG. 13 is a block diagram illustrating a map-reduce operation on a data stream, according to one embodiment.

FIG. 13 is a block diagram 1300 illustrating operation of map-reduce functions on a data stream, according to one embodiment. The map-reduce functions can be performed by nodes of the distributed storage system, such as nodes 704(1)-704(N). The distributed storage system (e.g., that uses DFS, such as HDFS) can include multiple nodes that store various data blocks. These nodes are also configured to perform various operations on that stored data. Depending on the implementation, the DFS system can store the received data stream (i.e., data stream 1302) among nodes 704(1)-704(N). The DFS system can also store the received index (index 1314). The DFS system can receive the index from the software agent. Depending on the implementation, the DFS system can receive the data stream from the software agent and/or the backup software.

For explanation purposes only, each node of the DFS system can implement a map function 1306(1)-1306(N). Each map function 1306(1)-1306(N) can access one of the objects as indicated by index 1314. The distribution of map functions 1306(1)-1306(N) among nodes 704(1)-704(N) can be managed by the DFS system. For example, map function 1306(1) can access object 1304(1) in data stream 1302, and generate an output 1308(1). Output 1308(1) can contain the object that is accessed by map function 1306(1). Similarly, other map functions 1306(2)-1306(N) can generate outputs 1308(2)-1308(N) that correspond to objects 1304(2)-1304(N), respectively. Thus, one map function 1306(1)-1306(N) can be initiated for each object specified by index 1314. In one embodiment, map functions 1306(1)-1306(N) can be initiated for a certain type of objects of data stream 1302, such as only for email objects.

In one implementation, each map function 1306(1)-1306(N) accesses the extents from the line of index 1314 corresponding to each object. Each map function 1306(1)-1306(N) can access data stream 1302, read the extents, concatenate them together (if multiple extents are provided for a single object). Each map function 1306(1)-1306(N) can also access an object name (or object type, or a file name) from the metadata. Each map function 1306(1)-1306(N) can generate output 1308(1)-1308(N), respectively, for each object. In one embodiment, each output 1308(1)-1308(N) can include a key-value pair, including the object name as a key, and the object contents as a value. The value can also include some metadata about each respective object.

Reduce function(s) 1310 can be implemented by one or more of nodes 704(1)-704(N) of the distributed storage system. Reduce function(s) 1310 can collect outputs 1308(1)-1308(N) from map functions 1306(1)-1306(N), and output them into a reduce output 1312 (such as an output file 1312). In one implementation, the output file can be a DFS data structure called a Sequence File. The sequence file is a binary file which stores a set of Key-Value pairs, where the Key is the name of object (i.e., filename), and the value is a map of the metadata and the content. This reduce output can then be used as input into analytics processes/operations.

Figure 14:
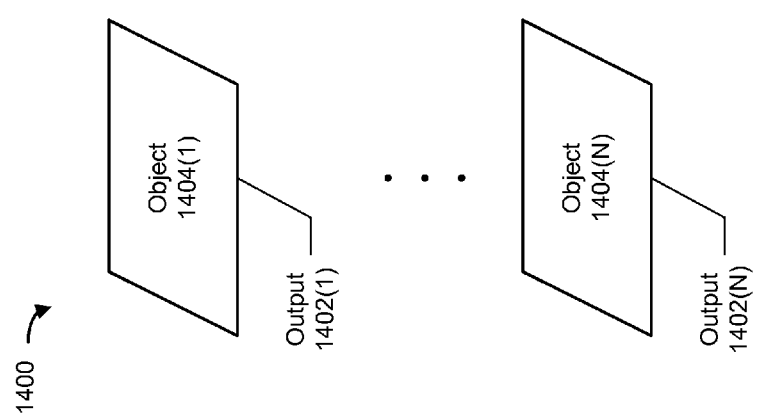
FIG. 14 is a block diagram illustrating outputs of map function(s), according to one embodiment.

FIG. 14 is a block diagram 1400 illustrating outputs of map functions, according to one or more embodiments. Each output 1402(1)-1402(N) can contain an object 1404(1)-1404(N), respectively. Each output 1402(1)-1402(N) can also contain some metadata regarding each such object 1404(1)-1404(N). In one embodiment, each such output can also include metadata regarding each respective object, such as object-type identifying metadata (e.g., identifying the object as an email object).

Figure 15:
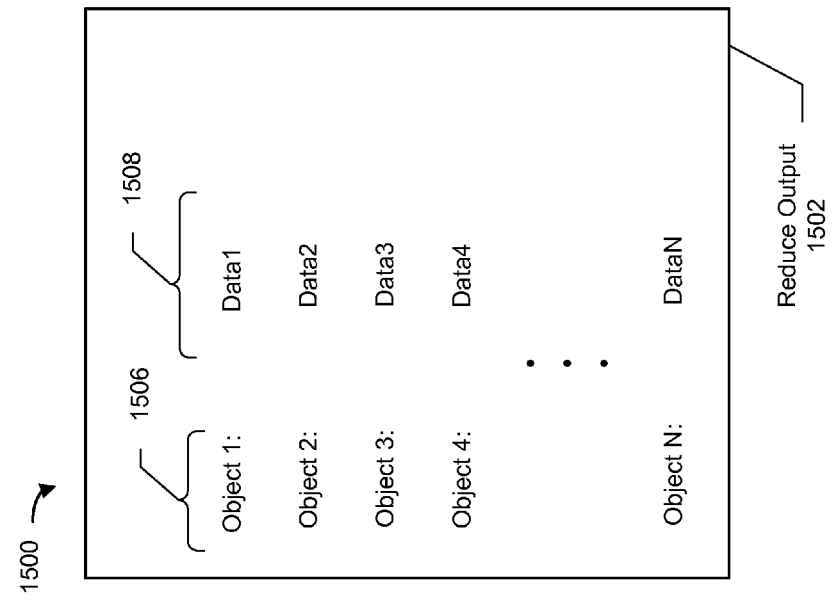
FIG. 15 is a block diagram illustrating reduce output of reduce function(s), according to one embodiment.

FIG. 15 is a block diagram 1500 of reduce output of reduce function(s), according to one or more embodiments. Reduce output 1502 contains object identifiers 1506 and object data 1508. Reduce output 1502 can be in a format that is readily accessible by analytic functions. For example, reduce output 1502 can include a list of object identifiers and corresponding data. Optionally, reduce output 1502 can also include metadata for each object. In one embodiment, reduce output 1502 can also group various types of objects together, such as all email objects together and all database objects together.

Figure 16:
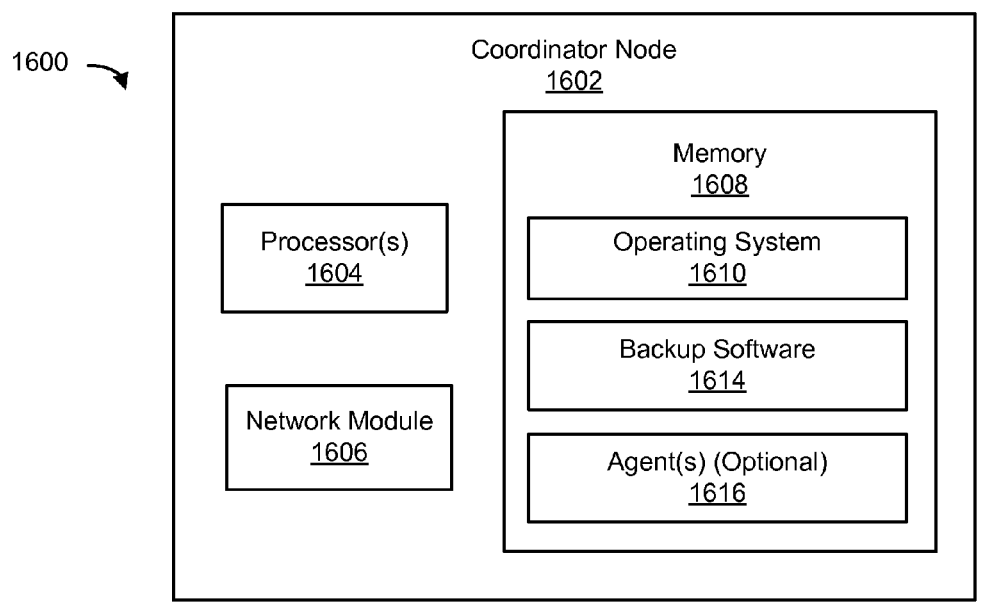
FIG. 16 is a block diagram illustrating various components of a coordinator node, according to one embodiment.

FIG. 16 is a block diagram 1600 of a coordinator node 1602, such as coordinator node 102 described in FIG. 1 and/or coordinator node 502 of FIG. 5, according to one or more embodiments. Coordinator node 1602 includes one or more processor(s) 1604, a network module 1606, and memory 1608. Memory 1608 can include one or more of operating system 1610, backup software 1614, or agent 1616. Processor(s) 1604 can execute one or more of operating system 1610, backup software 1614, or agent 1616. Agent 1616 can implement at least portions of methods 200, 300, 400, and 500, and the functionality described in FIG. 8. Network module 1606 can facilitate communication with other nodes over a network. It is also noted that in some embodiments one or more of elements of coordinator node 1602 may not be used.

Figure 17:
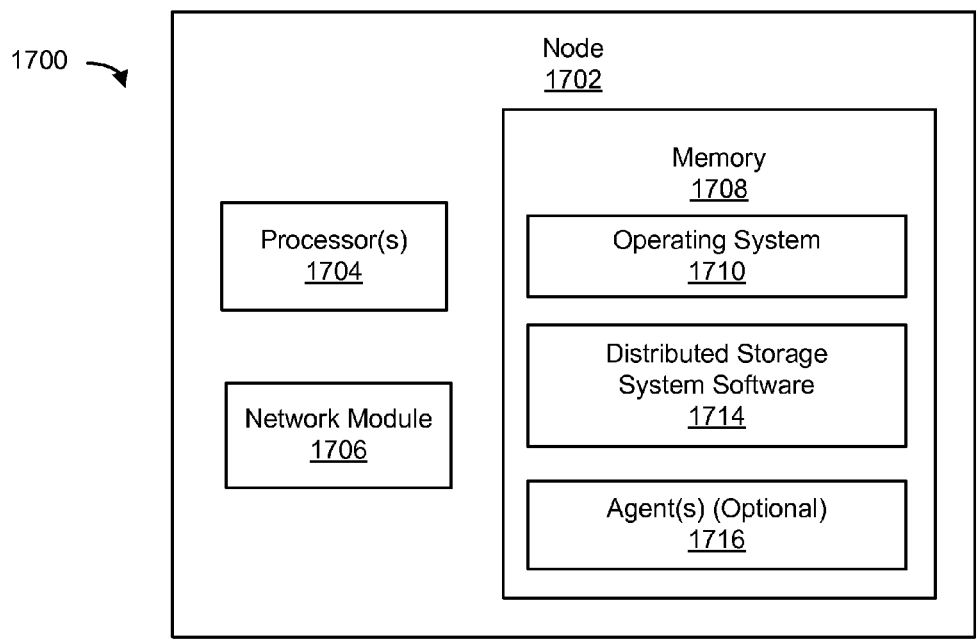
FIG. 17 is a block diagram illustrating various components of a node, according to one embodiment.

FIG. 17 is a block diagram 1700 of a node 1702 of a distributed storage system, such as nodes 116(1)-116(N) described in FIG. 1 and/or nodes 704(1)-704(N) of FIG. 7, according to one or more embodiments. Node 1702 includes one or more processor(s) 1704, a network module 1706, and memory 1608. Memory 1708 can include one or more of operating system 1710, distributed storage system software 1714, or agent 1716. Processor(s) 1604 can execute one or more of operating system 1710, distributed storage system software 1714, or agent 1716. Distributed system software can implement at least portions of method 300 and the functionality described in FIG. 13. Network module 1706 can facilitate communication with other nodes over a network.

Figure 18:
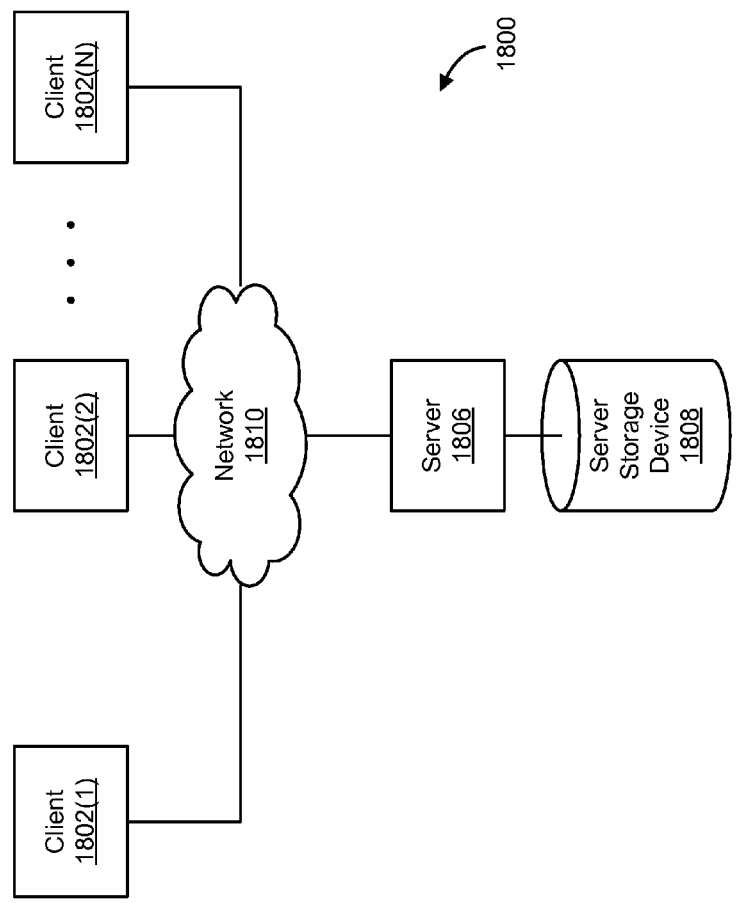
FIG. 18 is a block diagram illustrating a network architecture in which embodiments of the present application can be implemented.

Elements of network architecture can be implemented using different computer systems and networks. An example of one such network environment is described below with reference to FIG. 18. FIG. 18 is a simplified block diagram illustrating a network architecture 1800 in which one or more clients are provided with access to a server via various network connections. As depicted in FIG. 18, clients 1802(1)-(N) are coupled to a network 1810, and so are able to access a server 1806 (which can be used to implement node(s) of FIGS. 1, 5, and/or 7) via network 1810. Other servers (not shown) can be used instead to implement system(s) node(s) of FIGS. 1, 5, and/or 7). A client can be implemented using, for example, a desktop computer, a laptop computer, a workstation, a server, a cell phone, a smart phone, a network-enabled personal digital assistant (PDA), or the like. An example of network 1810, which can be used by clients 1802(1)-(N) to access server 1806, is the Internet. Alternatively, access to server 1806 can be provided by a local area network (LAN) utilizing Ethernet, IEEE 802.11x, or some other communications protocol. As will be appreciated, server 1806 can be accessed by clients coupled directly thereto (not shown).

As also depicted on FIG. 18, server 1806 is coupled to a server storage device 1808, which includes a data volume such as storage 114 and/or storage 124, among others. Server storage device 1808 can be implemented as a single storage device or a collection of storage devices. Server storage device 1808 can also be implemented as a storage area network, which couples remote storage devices to a server (e.g., server 1806), such that the remote storage devices appear as locally-attached storage devices to the server's OS, for example.

In light of the present disclosure, those of skill in the art will appreciate that server storage device 1808 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 1800 can include other components such as routers, firewalls and the like that are not germane to the discussion of the present network and will not be discussed further herein. Those of skill in the art will also appreciate that other configurations are possible. For example, clients 1802(1)-(N) can be directly coupled to server storage device 1808 without the user of a server or Internet; server 1806 can be used to implement both the clients and the server; network architecture 1800 can be implemented without the use of clients 1802(1)-(N); and so on.

As an example implementation of network architecture 1800, server 1806, services requests to data generated by clients 1802(1)-(N) to data stored in server storage device 1808. Any of the functionality of the nodes, agents, and/or administration modules can be implemented using one of the other servers in the manner illustrated by FIGS. 1, 5, and/or 7.

Figure 19:
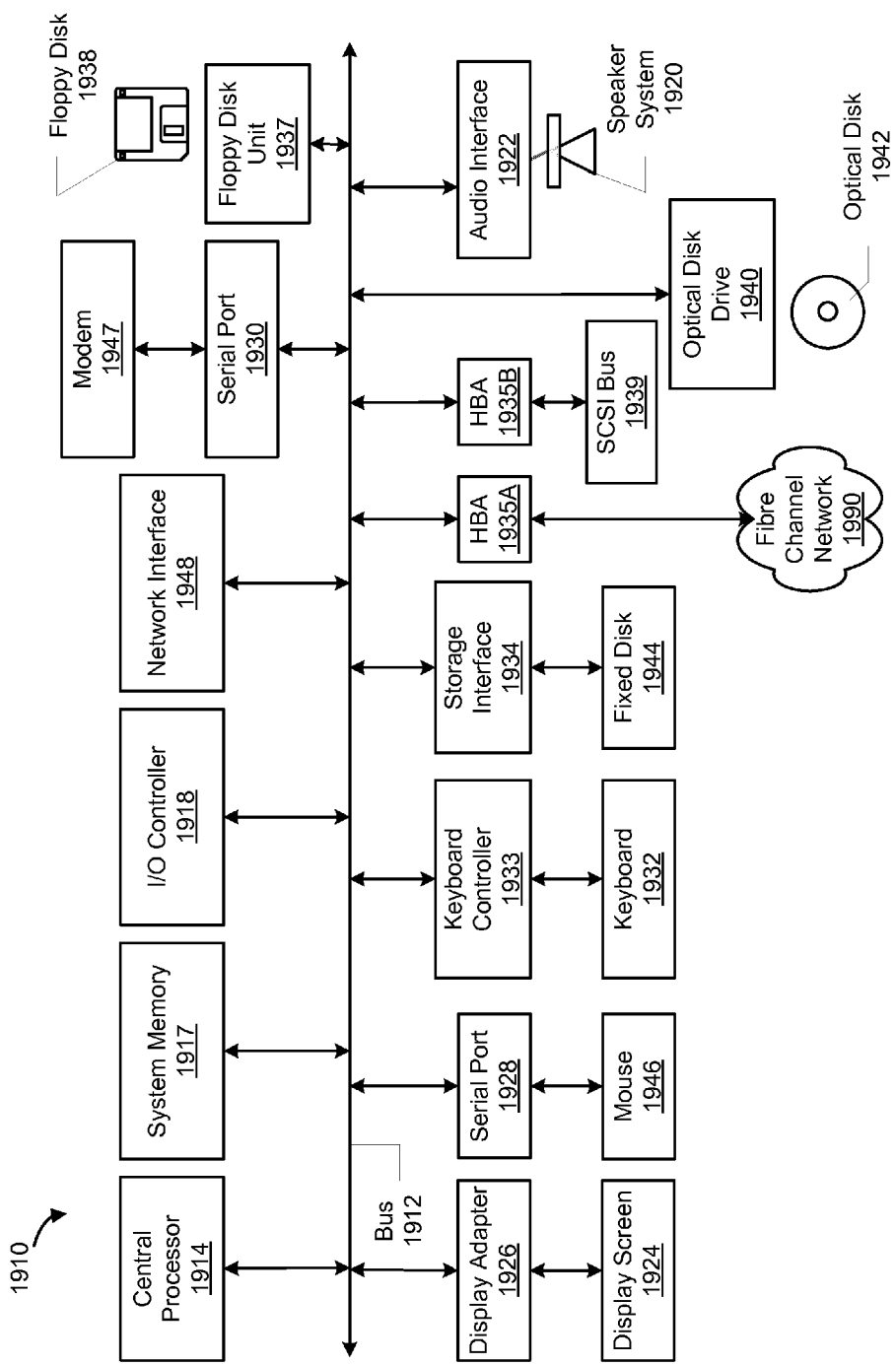
FIG. 19 is a block diagram that illustrates an example of a computer system suitable for implementing embodiments of the present application.

FIG. 19 depicts a block diagram of a computer system 1910 suitable for implementing the present disclosure. Computer system 1910 may be illustrative of various computer systems in the networked system of FIG. 1, such as node(s) and/or coordinator node(s), among others. Computer system 1910 includes a bus 1912 which interconnects major subsystems of computer system 1910, such as a central processor 1914, a system memory 1917 (typically RAM, but which may also include ROM, flash RAM, or the like), an input/output controller 1918, an external audio device, such as a speaker system 1920 via an audio output interface 1922, an external device, such as a display screen 1924 via display adapter 1926, serial ports 1928 and 1930, a keyboard 1932 (interfaced with a keyboard controller 1933), a storage interface 1934, a floppy disk drive 1937 operative to receive a floppy disk 1938, a host bus adapter (HBA) interface card 1935A operative to connect with a Fibre Channel network 1990, a host bus adapter (HBA) interface card 1935B operative to connect to a SCSI bus 1939, and an optical disk drive 1940 operative to receive an optical disk 1942. Also included are a mouse 1946 (or other point-and-click device, coupled to bus 1912 via serial port 1928), a modem 1947 (coupled to bus 1912 via serial port 1930), and a network interface 1948 (coupled directly to bus 1912).

Bus 1912 allows data communication between central processor 1914 and system memory 1917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1910 are generally stored on and accessed via a computer readable medium, such as a hard disk drive (e.g., fixed disk 1944), an optical drive (e.g., optical drive 1940), a floppy disk unit 1937, or other storage medium. Additionally, applications can be in the form of electronic signals modulated in accordance with the application and data communication technology when accessed via network modem 1947 or interface 1948.

Storage interface 1934, as with the other storage interfaces of computer system 1910, can connect to a standard computer readable medium for storage and/or retrieval of information, such as a fixed disk drive 1944. Fixed disk drive 1944 may be a part of computer system 1910 or may be separate and accessed through other interface systems. Modem 1947 may provide a direct connection to a remote server via a telephone link or to the Internet via an internet service provider (ISP). Network interface 1948 may provide a direct connection to a remote server via a direct network link to the Internet via a POP (point of presence). Network interface 1948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 19 need not be present to practice the present disclosure. The devices and subsystems can be interconnected in different ways from that shown in FIG. 19. The operation of a computer system such as that shown in FIG. 19 is readily known in the art and is not discussed in detail in this application. Code for using enabling use of analytics functions for distributed storage system data (such as described above with reference to the methods of FIGS. 2-4), etc., to implement the present disclosure can be stored in computer-readable storage media such as one or more of system memory 1917, fixed disk 1944, optical disk 1942, or floppy disk 1938. Memory 1920 is also used for storing temporary variables or other intermediate information during the execution of instructions by the processor 1910. The operating system provided on computer system 1910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   generating, using one or more processors, an index, wherein
       the index is generated for a data stream comprising a plurality of objects, and
       the index indicates a location of each of the plurality of objects;
   performing a plurality of first functions, wherein
       the plurality of first functions are performed substantially concurrently,
       each of the plurality of first functions accesses, based on the index, a respective object of the plurality of objects,
       the performing the plurality of first functions generates a plurality of first outputs, and
       the performing the each of the plurality of first functions comprises
           accessing a respective object of the plurality of objects, wherein
               the accessing is based on the index, and
           generating a respective first output of the plurality of first outputs, wherein
               the respective first output comprises the respective object; and
   performing one or more second functions, wherein
       the one or more second functions use the plurality of first outputs.

2. The method of claim 1, further comprising:
   storing the data stream using a distributed storage system, wherein
       the storing the data stream comprises
           generating boundary information for the plurality of objects,
       the generating the index is based, at least in part, on the boundary information.

3. The method of claim 2, wherein
   the generating the index is performed substantially during the storing the data stream.

4. The method of claim 1, further comprising:
   receiving a plurality of metadata, wherein
       the plurality of metadata indicates one or more characteristics of the data stream, and
       the generating the index is based, at least in part, on the plurality of metadata.

5. The method of claim 1, further comprising:
   performing a backup of a plurality of original data, wherein
       the performing the backup is based on a backup policy, and
   generating a plurality of data, wherein
       the generating the plurality of data is based, at least in part, on the original data.

6. The method of claim 5, wherein
   the plurality of original data is generated by one or more applications, and
   the plurality of objects are associated with the one or more applications.

7. The method of claim 5, wherein
   the performing the plurality of first functions further comprises
       accessing the plurality of objects in the data stream based on the locations indicated by the index, wherein the data stream comprises the plurality of data, and wherein each object of the plurality of objects comprises a respective subset of the plurality of data.

8. The method of claim 1, wherein
the performing the one or more second functions further comprises
aggregating the plurality of objects into one or more aggregated outputs.

9. The method of claim 8, further comprising:
generating a sequence file using the one or more aggregated outputs.

10. The method of claim 8, further comprising:
performing one or more analytic functions on the plurality of objects in the data stream, wherein the performing uses the one or more aggregated outputs.

11. A system, comprising:
one or more processors;
a software agent, wherein
the software agent is configured to generate an index for a data stream,
the data stream comprises a plurality of objects,
the index is configured to indicate a respective location of each of the plurality of objects, and
the software agent is configured to be executed using the one or more processors; and
a plurality of nodes, wherein
the plurality of nodes are configured to
store the data stream,
perform a plurality of mapping functions, wherein
the plurality of mapping functions are configured to be performed substantially concurrently,
each of the plurality of mapping functions are configured to access, based on the index, a respective object of the plurality of objects,
the performing the each of the plurality of mapping functions is configured to
access a respective object of the plurality of objects, wherein
the accessing is based on the index, and
generate a respective first output of a plurality of first outputs, wherein
the respective first output comprises the respective object; and
perform one or more reduce functions, wherein
the one or more reduce functions are configured to use the plurality of first outputs.

12. The system of claim 11, wherein
the software agent is configured to generate the index using the data stream substantially during the plurality of nodes performing the storage of the data stream.

13. The system of claim 11, wherein
the software agent is configured to
receive a plurality of metadata, wherein
the plurality of metadata indicates one or more characteristics of the data stream, and
the software agent is configured to generate the index based, at least in part, on the plurality of metadata.

14. The system of claim 11, further comprising:
backup software, wherein
the backup software is configured to perform a backup of a plurality of original data,
the backup software is configured to perform the backup based on a backup policy, and
generating a plurality of data, wherein
the generating the plurality of data is based, at least in part, on the original data.

15. The system of claim 14, wherein
the plurality of original data is generated by one or more applications, and
the plurality of objects are associated with the one or more applications.

16. The system of claim 11, wherein
the plurality of nodes are configured to perform the plurality of mapping functions, further comprising
accessing the plurality of objects in the data stream based on the respective locations indicated by the index, wherein
the data stream comprises a plurality of data, and
each object of the plurality of objects comprises a respective subset of the plurality of data.

17. A computer program product comprising:
a plurality of instructions, comprising
a first set of instructions, executable on a computer system, configured to generate an index, wherein
the index is generated for a data stream comprising a plurality of objects, and
the index indicates a location of each of the plurality of objects,
a second set of instructions, executable on the computer system, configured to perform a plurality of first functions, wherein
the plurality of first functions are performed substantially concurrently,
each of the plurality of first functions accesses, based on the index, a respective object of the plurality of objects,
the performing the plurality of first functions generates a plurality of first outputs, and
the performing the each of the plurality of first functions comprises
accessing a respective object of the plurality of objects, wherein the accessing is based on the index, and
generating a respective first output of the plurality of first outputs, wherein
the respective first output comprises the respective object,
a third set of instructions, executable on the computer system, configured to, perform one or more second functions, wherein
the one or more second functions use the plurality of first outputs; and
a non-transitory computer-readable storage medium, wherein the instructions are encoded in the computer-readable storage medium.

18. The computer program product of claim 17, wherein
the first set of instructions is further configured to generate the index substantially during storing of the data stream.

19. The computer program product of claim 17, wherein
the instructions further comprise
a fourth set of instructions, executable on the computer system, configured to receive a plurality of metadata, wherein
the plurality of metadata indicates one or more characteristics of the data stream, and wherein
the first set of instructions is further configured to generate the index based, at least in part, on the plurality of metadata.

20. The computer program product of claim 17, wherein
the instructions further comprise:
a fourth set of instructions, executable on the computer system, configured to perform a backup of a plurality of original data, wherein the performance of the backup is based on a backup policy, and a fifth set of instructions, executable on the computer system, configured to generate a plurality of data, wherein the generation of the plurality of data is based, at least in part, on the original data.

21. The method of claim 1, wherein a second function of the one or more second functions is performed on at least a subset of the plurality of the first outputs.

* * * * *